United States Patent [19]

Ballard et al.

[11] Patent Number: 4,951,870
[45] Date of Patent: Aug. 28, 1990

[54] OVERTEMPERATURE CONTROL

[75] Inventors: Gary W. Ballard, Plainfield; John D. Stout, Indianapolis, both of Ind.

[73] Assignee: Carrier Corporation, Syracuse, N.Y.

[21] Appl. No.: 482,466

[22] Filed: Feb. 21, 1990

[51] Int. Cl.$^5$ .............................................. F23N 5/20
[52] U.S. Cl. ........................................ 236/11; 62/158; 165/12; 236/46 E; 431/68
[58] Field of Search ............... 236/46 E, 10, 11, 21 B; 431/27, 68; 165/12; 364/557; 62/158–161

[56] References Cited

U.S. PATENT DOCUMENTS

| | | | |
|---|---|---|---|
| 4,373,662 | 2/1983 | Bassett et al. | 236/10 |
| 4,445,841 | 5/1984 | Tanaka et al. | 431/27 |
| 4,790,143 | 12/1988 | Hanson | 62/158 |

*Primary Examiner*—William E. Wayner
*Attorney, Agent, or Firm*—Dana F. Bigelow

[57] ABSTRACT

A blower motor failure is detected by a sensor/switch that opens at a first preset temperature level and automatically resets for the next cycle. The occurrences of such openings per thermostat cycle are counted and when they reach a predetermined number, the microprocessor causes the system to lockout from further operation, thereby preventing the temperatures from reaching excessive levels. In order that the same system may be used in a horizontal furnace installation where the first sensor is less responsive because of its location, a second sensor, of the manually resettable type and having a preset temperature level for opening which is higher than said first temperature limit, is employed to thereby lockout the system.

7 Claims, 5 Drawing Sheets

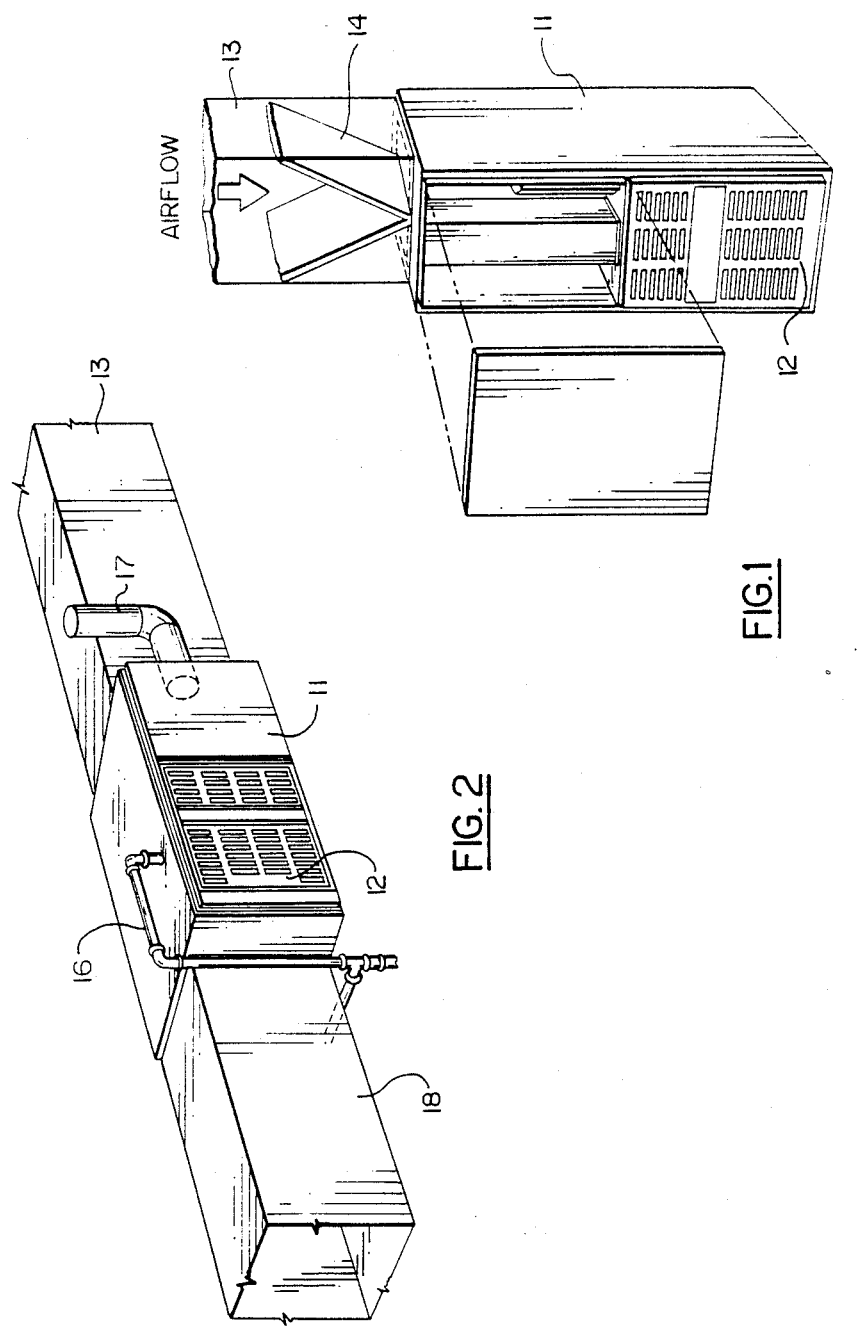

OVERTEMPERATURE CONTROL

BACKGROUND OF THE INVENTION

This invention relates generally to furnaces and, more particularly, to control method and apparatus for responding to overtemperature conditions in a furnace.

In downflow furnaces, the circulating air blower and its drive motor are located above the heat exchanger, whereas, in horizontal furnace, the blower and drive motor are located to one side of the heat exchanger. In either the downflow or the horizontal furnace, if a blower motor fails to operate properly in its normal manner while the burner is on during the heating cycle, the temperatures within and around the furnace will tend to rise. It is therefore desirable that such a condition be sensed and that the resulting temperatures not be allowed to reach excessive levels. In downflow furnaces, especially, the filters are located above the blower compartment which in turn, is located above the heat exchangers; and when the blower motor fails, the heat rises by natural confection causing an overtemperature condition in the blower compartment so as to thereby expose the filter to excessive temperatures.

One approach to addressing this problem is to provide, along with a temperature sensing device, a switch that opens in response to such overtemperature conditions. The switch can then be manually reset when the sensed overtemperature condition has been corrected. However, with such a manual switch, there will be occurrences of nuisance trips, such as when, for example, a short power interruption occurs just before the blower is to come on. Also in attic installation, where the temperature in the summer exceeds the trip temperature setting, the switch will be tripped open and, subsequently, when cool weather occurs and a call for heat is not responded to, a service call is required to reset the switch.

A preferred approach was therefore to use an automatic reset limit switch which automatically recloses after it cools down. However, it was found that after a certain number of consecutive overtemperature cycles resulting from a blower motor failure, the maximum allowable temperature of the material used in the air filters was exceeded.

It is possible to provide a single furnace design which can be used either in the upright (i.e., a downflow configuration) or a horizontal disposition. While it is desirable to have a single type of overtemperature control to respond to the overtemperature conditions as discussed hereinabove, it was recognized that the sensitivity to such overtemperature conditions would be different for a given furnace, depending on whether it is in the upright or in the horizontal position. For example, since it is desirable to sense the temperature within the furnace blower compartment, and since the heat from the heat exchanger tends to rise thereabove, a sensor would be exposed to higher temperatures when the furnace is in an upright position than when it is in a horizontal position such that the sensor is at one side rather than above the heat exchangers. It therefore becomes more complicated to have a single design of an overtemperature system that will accommodate either position of installation.

It is therefore an object of the present invention to provide an improved control system for overtemperature conditions.

Another object of the present invention is the provision in a gas furnace having overtemperature control, for avoiding nuisance trips which then require manual resetting before proper operation resumes.

Yet another object of the present invention is the provision for an overtemperature control system in a furnace which can be operated in either the upright or the horizontal positions.

Still another object of the present invention is the provision in a gas furnace for an overtemperature control system which is economical to manufacture and efficient and effective in use.

These objects and other features and advantages become more readily apparent upon reference to the following description when taken in conjunction with the appended drawings.

SUMMARY OF THE INVENTION

Briefly, in accordance with one aspect of the invention, there is provided an auxiliary limit switch that opens in response to overtemperature conditions resulting from failure of the blower motor, but which resets after its sensor is allowed to cool down. In order to prevent the temperatures from becoming excessive if the blower motor continues to not function in subsequent cycles, a microprocessor is used to count the occurrences of automatic resets and, when that number reaches a predetermined threshold level, the system is caused to lockout. Manual intervention is then required to reset the system.

By another aspect of the invention, provision is made to use an additional overtemperature switch to accommodate the horizontal installation wherein the automatic reset switch is placed in such a location that it is less responsive to the temperature conditions. The threshold temperature for the manual resettable overtemperature switch is chosen to be higher than that of the automatic reset switch such that the automatic resettable switch dominates in an upright installation condition. But the threshold temperature of the manual resettable switch is also chosen so as to reduce the likelihood of nuisance trips that may occur.

In the drawings as hereinafter described, a preferred embodiment is depicted; however, various other modifications and alternate constructions can be made thereto without departing from the true spirit and scope of the invention.

BRIEF DESCRIPTION OF THE DRAWINGS

FIG. 1 is a perspective view of a downflow furnace to which the present invention relates.

FIG. 2 is a perspective view of such a furnace in a horizontal installation.

DESCRIPTION OF THE PREFERRED EMBODIMENT

Figure 3:
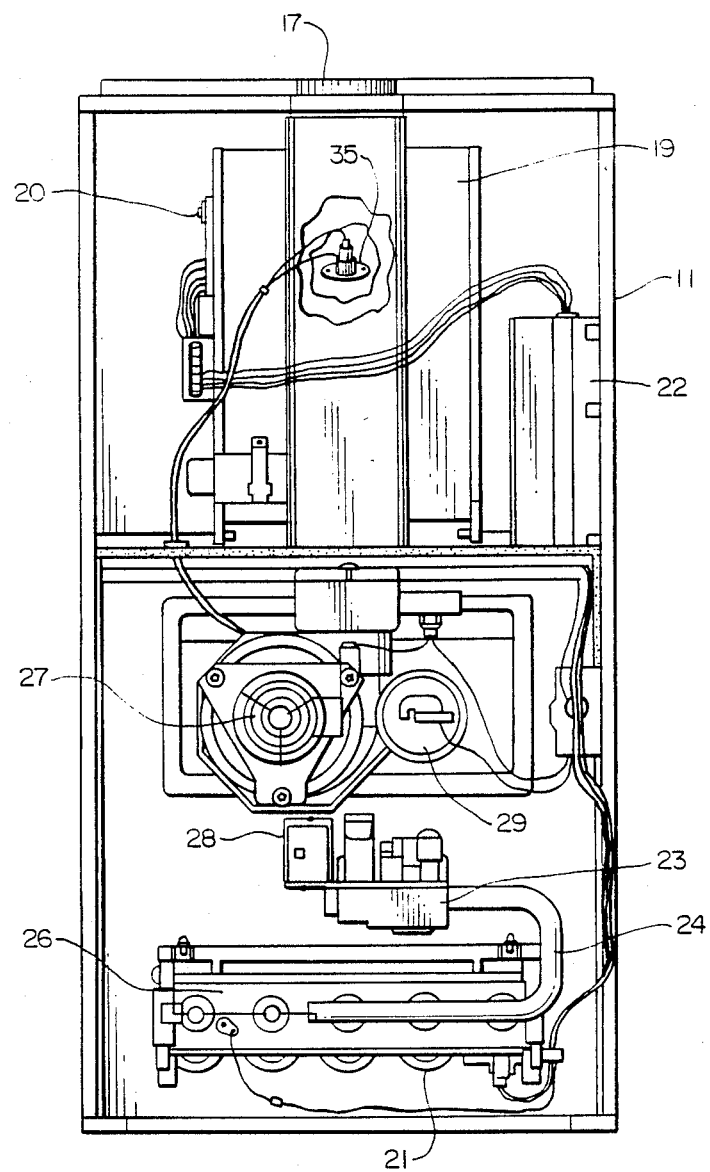
FIG. 3 is a front view of a furnace having the present invention incorporated therein.

Referring now to FIG. 1, there is shown a typical downflow furnace 11 having a louvered front cover 12 for admitting air to be mixed with combustion gas to be burned in the combustion apparatus, with the resulting gases then being exhausted from a flue vent (not shown). At the same time, the air to be heated is flowing into the furnace by way of a return air plenum 13 having a pair of filters 14 disposed therein. The air is drawn into the furnace by way of a blower fan in the top section thereof, with the air then passing downwardly across the heat exchangers and then into the heating ducts.

In the event of a failure of the blower motor, the combustion apparatus will continue to operate, but with the circulation air blower inoperative, the downward flow of air will not occur, thereby allowing the temperature in the heat exchanger to rise to higher than normal levels. It is therefore desirable to sense such condition and to take appropriate corrective action before the temperature conditions around the furnace (e.g., in the vicinity of the filters 14) reach undesirably high levels.

Shown in FIG. 2 is the same furnace 11 which has been installed in a horizontal position by laying it on its side. Again, the combustion air passes into the louvered front cover 12 where it enters the combustion apparatus to be mixed with gas that is being fed into the gas entry pipe 16. The resulting combustion exhaust is then discharged from the flue vent 17.

In counterflow relationship, the air to be heated enters the return air plenum 13, passes through the furnace to pick up the heat from the heat exchanger, and then into the hot air duct 18 to be distributed into the space(s) to be heated. This horizontal furnace, like the downflow furnace described above, is susceptible to failures of the blower motor, in which case the furnace temperatures can become excessive unless provision is made to control the operation of the furnace. The present invention is therefore designed to sense such an overtemperature condition and to make appropriate operational changes to prevent those temperatures from becoming excessive. Further, the control apparatus is the same for both horizontal and upright installations, such that a single furnace design can be used in either upright or horizontal installations.

It should be mentioned that, although the otherwise upright furnace has been used in a horizontal installation by simple placing the furnace on its right side, it could just as well be installed by placing it on its left side.

Figure 4:
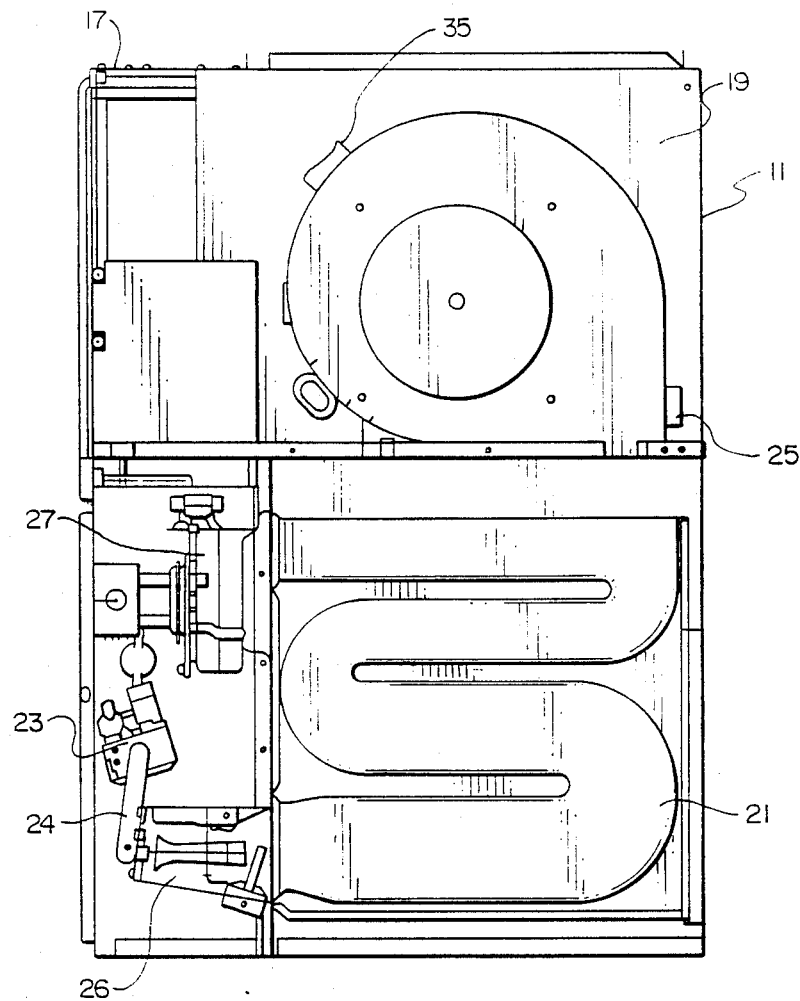
FIG. 4 is a side view thereof.

FIG. 3 shows a front view of the gas fired, downflow furnace with the front covers removed. FIG. 4 shows a right side, internal view thereof, with certain structures removed to thereby present a simplified view of the major components relating to the present invention. The circulation blower assembly 19 is shown in the top portion of the furnace, and the heat exchanger 21 is shown in the lower portion thereof. Electronic control module 22 is provided to regulate and coordinate the various functions of those and other components within the furnace.

Near the lower front portion of the furnace, a gas valve 23, which is responsive to electronic control module 22, selectively provides gas along a conduit 24 to the burner assembly 26 which operates to combine the gas and air for combustion. The hot gases then flow into the heat exchanger 21 where they pass upwardly and are eventually exhausted from the flue vent 17. To aid in the combustion process, a draft inducer blower 27 operates to draw the combustion gases up into the heat exchanger 21, into a collector box 30, through the draft inducer 27, and out the flue vent 17.

The drive motor for the draft inducer 27 as well as the drive motor for the circulation air blower 19 are controlled by way of the electronic control module 22.

In the event that the drive motor for the circulation air blower 19 fails to operate within the proper manner so as to pass air downwardly over the heat exchanger 21, the temperature levels within the furnace will tend to increase, since the fuel valve 23, inducer 27 and burner 26 will continue to operate. The present invention is therefore intended to sense such a condition and to make appropriate changes in the control mechanism to thereby alleviate or lessen the seriousness of the problem.

One of the safeguards against excessively high temperatures in the system is a main limit switch 28 which is designed to open at a predetermined temperature level and to automatically reset (i.e., close) when the sensed temperature is subsequently reduced below that threshold level. As will be seen in FIG. 3, the main limit switch 28 is located, near the fuel valve 23. Its operation and relationship with the electronic control module 22 will be described hereinafter.

Also located in the lower front portion of the furnace is a pressure switch 29, which operates in response to sensed pressures in the collector box 30 to shut off the furnace if the air supply is inadequate such as, for example, if the louvered front cover 12 were to become blocked. If the inducer 27 is operating at the proper speed and there are no undesirable restrictions against the flow of air into the burner assembly 26 and through the heat exchanger 21, there should be a negative pressure in the collecter box 30. If that negative pressure is not sensed by the pressure switch 29 at times when it should exist, then the switch 29 will open to shut down the furnace. Like the main limit switch 28, the pressure switch 29 also operates in electrical communication with the electronic control module 22 in a manner to be described hereinafter.

With only the main limit switch 28 in the system for purposes of responding to failure of the blower motor 20, the automatic reset feature of the main limit switch 28 would allow the temperatures within the furnace to build up to undesirable levels. That is, even though the main limit switch 28 would wait until it was cooled down to the threshold temperature before it reset and caused the system to again operate in the normal manner, there would still be residual heat in the system at that time. Therefore, after operating through several (e.g. six) cycles of the limit switch 28, the residual build up of temperature would finally exceed the allowed limit. Further means of protection is therefore provided by way of auxiliary limit switches.

Mounted on the housing of the circulation air blower 19 are auxiliary limit switches 25 and 35. These switches are conventional bi-metal actuated, normally closed switches which open at preset temperatures. For reasons that will become apparent, the auxiliary limit switch 25 is preset at a lower threshold temperature than the auxiliary limit switch 35, and upon the sensor in the switch 25 becoming cooled down below its threshold temperature, the switch 25 will automatically reset. The auxiliary limit switch 35, on the other hand, with its higher pre-set threshold temperature, is preferably of the manually resettable type. The two auxiliary limit switches 25 and 35 are designed to operate in concert to accommodate the overtemperature safeguard functions of the gas fired furnace when operating either in the upright or the horizontal positions.

Figure 5:
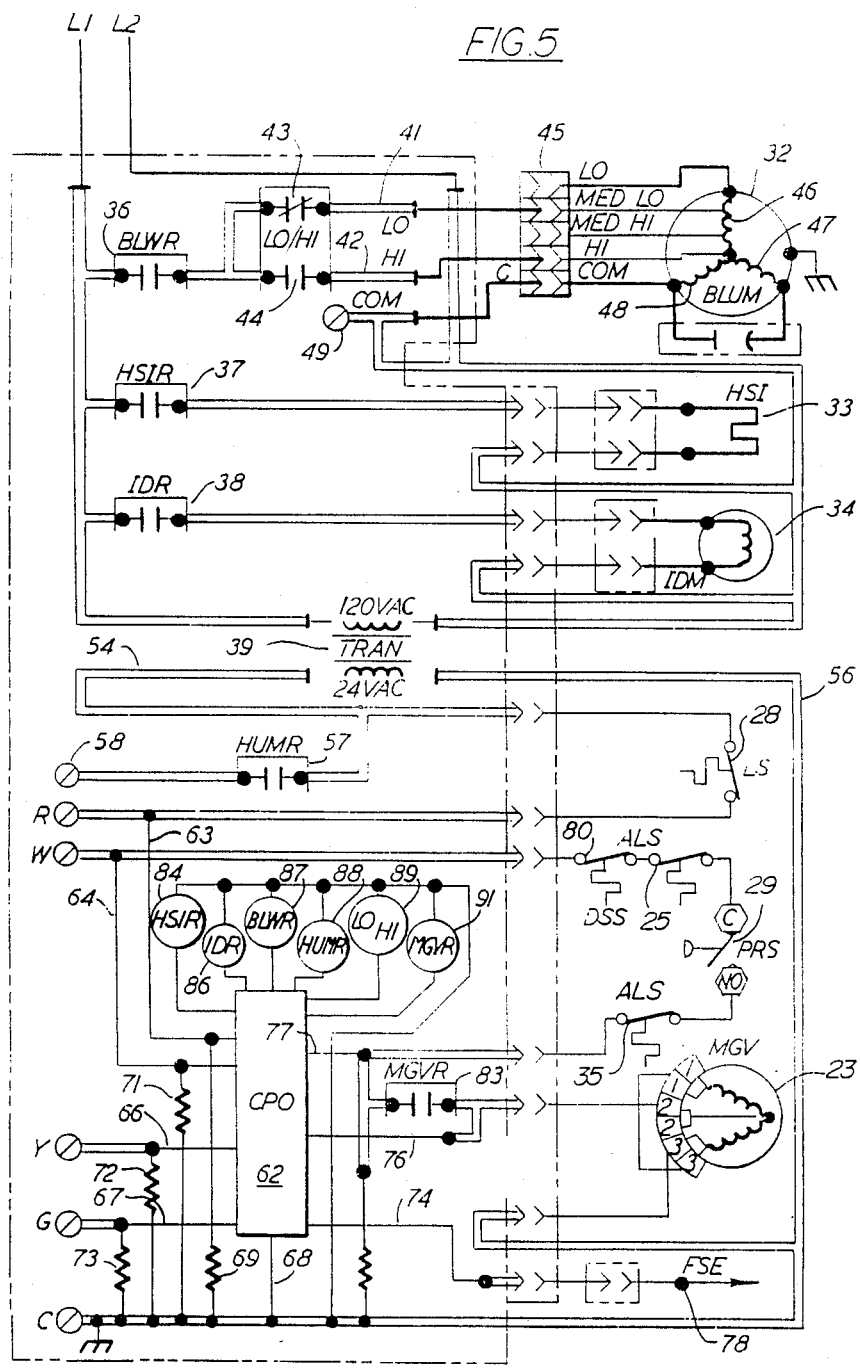
FIG. 5 is a schematic illustration of the control circuitry of the present invention.

Referring now to FIG. 5, the various components of the induced draft gas furnace are shown together with their controlling circuitry which is adapted to operate in accordance with the present invention. A circuit board, which is contained in the electronic control module 22 and indicated by the broken lines, is provided with line voltage by way of leads L1 and L2. Power is thereby provided to the circulating air blower motor 32, a hot surface igniter 33, and an induced draft blower motor 34 by way of relays 36, 37 and 38, respectively. Power is also provide to the control portion of the circuit board by way of a low voltage stepdown transformer 39.

Included in the circuit supplying power to the blower motor 32, in addition to the relay 36, are parallel leads 41 and 42 which provide for low and high speed connections, respectively, and a single pole, double throw relay with the low speed lead 41 having normally closed relay contacts 43 and the high speed lead 42 having normally open relay contacts 44. Both the low speed lead 41 and the high speed lead 42 are connected by way of a five circuit connector 45 to one leg 46 of the Wye connected blower motor 32, with the other legs 47 and 48 being connected via the connector 45 to a common terminal 49. Thus, by selectively choosing the desired connector terminals 45 to be used, and by controlling the relay contact 43 and 44, the blower motor 32 can be selectively caused to operate at either of the selected levels of low or high speeds. Referring now to the control or bottom portion of the circuit, low voltage power is provided from the secondary coil of the transformer 39 to the conductor 54 and to the conductor 56, which is connected to the common terminal C. The conductor 54 is electrically connected through normally open relay contacts 57 to a terminal 58 which can be connected to provide power to auxiliary equipment such as a humidifier (not shown), and also to a circuit which includes the automatic resettable main limit switch 28 sensitive to overtemperature, and the terminal R.

In addition to the conventional connections as discussed hereinabove, the R, W, Y, G, and C terminals of the circuit board are connected in a conventional manner to the room thermostat (not shown). Each of those terminals is connected to a microprocessor 62 by way of leads 63, 64, 66, 67, and 68, respectively. Load resistors 69, 71, 72 and 73 are provided between the common terminal C and the respective terminals R, W, Y and G to increase the current flow through the circuits to thereby prevent the occurrence of dry contacts.

Other inputs to the microprocessor 62 are provided along lines 74, 76 and 77. The line 74 is connected to a flame sensing electrode 78 to provide a signal to the microprocessor 62 to indicate when a flame has been proven to exist. Lines 76 and 77 provide other indications as will be discussed hereinafter.

Power to the main gas valve 23 is received from the terminal W by way of a draft safeguard switch 80, the automatically resettable switch 25, the pressure switch 29, the manually resettable switch 35, and the normally open relay 83. For control purposes, the microprocessor 62 is made aware of the condition of the auxiliary limit switchs 25 and 35, and of the pressure switch 29 by way of signals received along line 77. A particular control function relating to the use of cumulative operational history of the auxiliary limit switch 25 will be described in more detail hereinafter. The line 76 is connected to the output of the relay 83 and provides voltage level signals to indicate to the microprocessor 62, whether the gas valve 23 should be on or off.

Having described the circuits that are controlled by the microprocessor 62 through the use of relays, the controlling outputs of the microprocessor 62 will now be briefly described. The hot surface ignitor output 84 operates to close the relay contacts 37 to activate the hot surface igniter 33. The inducer motor output 86 operates to close the relay contacts 38 to activate the inducer motor 34. The blower motor output 87 operates to close the relay contacts 36 to activate the blower motor 32. The humidifier output 88 operates to close the relay contacts 57 to activate the humidifier. The low/high relay output 89 operates to open the relay contacts 43 and close the relay contacts 44 to switch the blower motor 32 from low to high speed operation. Finally, the main gas valve output 91 operates to close the relay contacts 83 to open the main gas valve 23.

Considering now the operation of the control apparatus during a typical heating cycle, the sequence of operation will be as follows. When the wall thermostat calls for heat, the R and W circuits are closed. The microprocessor 62 checks the inputs and outputs and energizes the inducer relay 38 to start the inducer motor 34 and initiate the process of purging the system of unwanted gas. As the inducer motor 34 comes up to speed, the pressure switch 82 closes, and after a predetermined period of time, the microprocessor 62 activates the hot surface ignitor relay 37 to provide power to the hot surface ignitor 33. After a warmup period of a predetermined time, the microprocessor 62 activates the main gas valve relay 83 to provide power to and turn on the main gas valve 23. As soon as a flame is sensed by the flame sensing electrode 78, the microprocessor 62 deactivates the hot surface ignitor 37, and holds the main gas valve on so long as the flame is present or until the thermostat is satisfied.

The blower motor 32 is delayed from starting after the main burners ignite to allow sufficient warming up of the heat exchanger 21. The blower motor 32 is then turned on at low speed after a short period of time. If the blower motor 32 fails to come on or fails to run at a sufficient speed, the gas valve 23 will remain on, such that the temperature in the furnace will commence to rise. At this time, any of the overtemperature sensors and switches 28, 25 or 35 may come into play, depending on the existing conditions and the particular furnace installation.

Assuming, first of all, that the furnace 11 is installed in an upright position such that the auxiliary limit switches 25 and 35 are located above the heat exchanger 21 as shown in FIG. 4. When the temperature in the blower compartment reaches the threshold temperature (i.e., 130° F.) of the auxiliary limit switch 25, it will open. This, in turn, will cause the microprocessor 62 to shut off the gas valve 23 and attempt to turn the blower motor 32 on low speed. This will not occur, of course, if the blower motor 32 is inoperative, but the blower compartment will still tend to cool down by convection since the gas valve is now closed. When the sensor of the auxiliary limit switch 25 has cooled down below its threshold level, the switch will close and the furnace commence another operational cycle. If the blower motor again fails to operate properly, the same thing will again occur, with the auxiliary limit switch 25 opening and then resetting. If this continues, the residual heat in the blower compartment tends to build up to a point to where the maximum allowable temperature of the circulating air filter 14 may be exceeded. This has been found to occur after six consecutive overtemperature cycles of the system. It is therefore necessary to change the operation of the system before that occurs.

Figure 6:
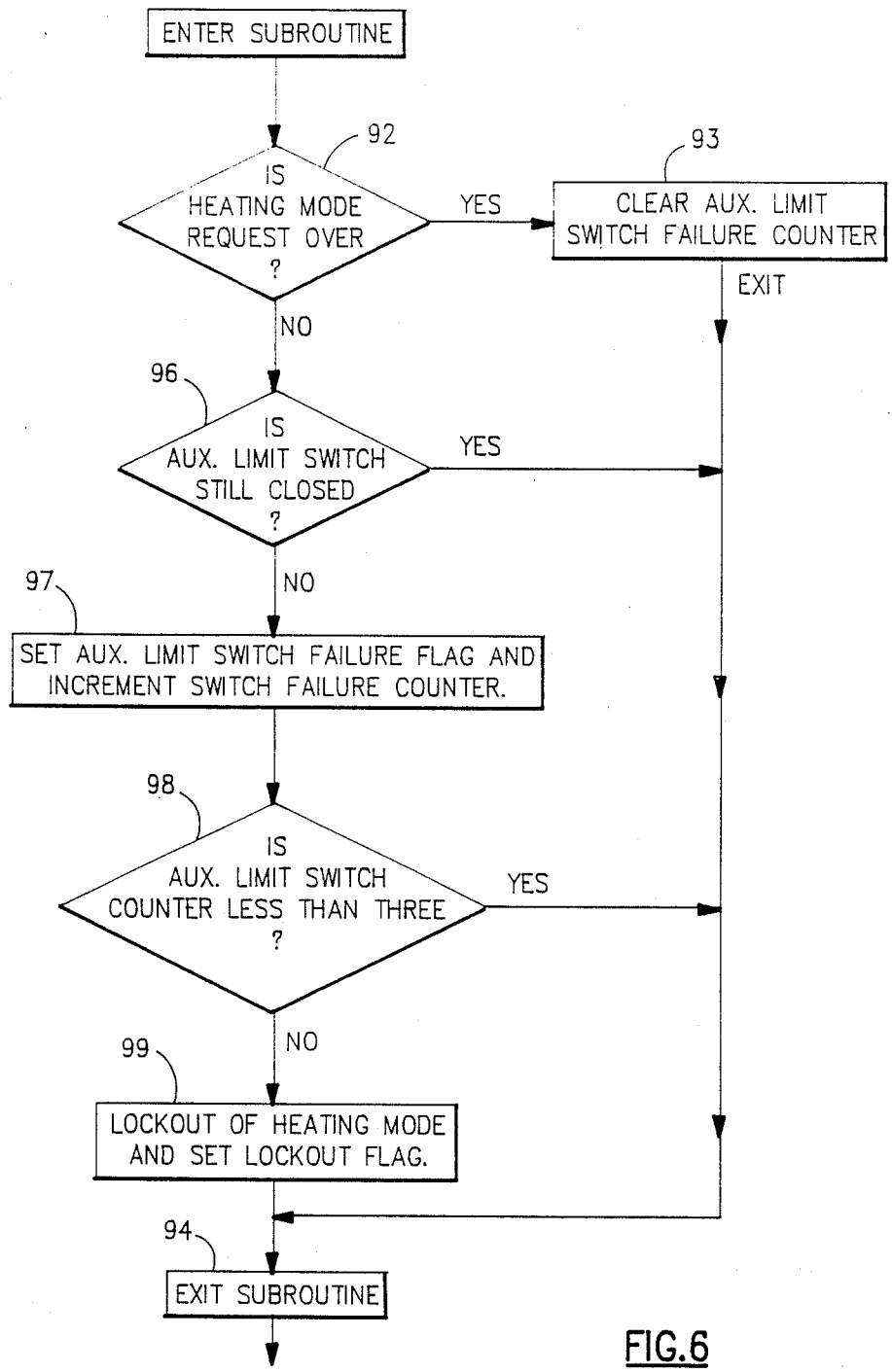
FIG. 6 is a schematic illustration of a flow chart showing a particular process of the present invention.

For that purpose, there is provided a subroutine of the microprocessor 62 as shown in FIG. 6. In block 92, the system is queried as to whether the heating mode request is over. If it is, the process steps to block 93 wherein an auxiliary limit switch failure counter (located in the microprocessor 62) is cleared, and the subroutine is exited at block 94. If, on the other hand, a call for heat continues to exist, the process steps to block 96 wherein the microprocessor 62 queries as to whether or not the auxiliary limit switch 25 is still closed. If it is, the subroutine is exited. If it is not, then the auxiliary limit switch failure flag is set and the switch failure counter is incremented as set forth in block 97. The process will then step to block 98 where, if this is the first such occurrence, the subroutine will be exited and, since the call for heat has not been satisfied, another cycle will begin. If, in this second cycle, the blower motor 32 operates properly, then the system will operate in a normal manner and, when the thermostat demand has been satisfied, the subroutine will be entered and the process will step through blocks 92, 93 and 94. If, on the other hand, the blower motor 32 continues to be inoperative, then the auxiliary limit switch 25 will again be caused to open, the query in block 96 will be answered in the negative and a second count will be registered as provided in block 97. The answer to the query at block 98 will again be "yes" and a third cycle will be commenced. During this third cycle, the query in block 98 will be answered in the negative and in response, the system will be locked out of the heating mode, and the lock out flag will be set as set forth in block 99. In the lock out mode, all outputs are turned off, except the inducer motor remains on for a short period of time and is then turned off. The system will then remain off unless it is reset by way of a manual intervention.

As an alternative to the above procedure, rather than counting the occurrences of consecutive trips by the auxiliary limit switch during a thermostat cycle of operation, the system may be programmed to instead count the number of such trips of the main limit switch 28 and then go into a lock out mode when a predetermined number is exceeded.

Assuming now that the same furnace 11 is installed in a horizontal position such that the auxiliary limit switches 25 and 35 are at one side of the heat exchanger 21 rather than above it, when a blower motor 32 fails to operate properly, the auxiliary switches 25 and 35 are more isolated from the heat that rises by convection from the heat exchanger 21. In such a situation it was found that before the auxiliary limit switch 25 reached its 130° F. threshold temperature, the main limit switch 28 would trip open. When this occurred, the system would shut off the gas valve 23 and attempt to turn on the blower motor 32. It would also turn off the inducer motor 34, which in turn caused the pressure switch 29 to open. Since the pressure switch 29 is in series with the auxiliary limit switchs 25 and 35, that circuit was now open and the microprocessor 62 could no longer sense whether the auxiliary limit switchs were open or closed. The counting process as described hereinabove was therefore effectively eliminated. The result was that the auxiliary limit switch 25 would not be effective to lock out the system and therefore it would continue to recycle with the main limit switch 28 being tripped and reset until such time that the maximum allowable temperature of the circulating air filter material was exceeded. It was therefore desirable to have another means which would allow the furnace to be installed in either the upright or horizontal positions while being sensitive and responsive to overtemperature conditions. The manually resettable auxiliary limit switch 35 serves this purpose.

The auxiliary limit switch 35, like the auxiliary limit switch 25 is mounted in the blower compartment and is therefore above the heat exchanger 21 in the upright installations and alongside the heat exchanger 21 in the horizontal installations. In order to prevent the manually resettable auxiliary limit switch 35 from overriding the automatically resetting auxiliary limit switch 25, it is necessary that its preset temperature threshold be higher. Further, it is desirable that its setpoint and location will not allow it to be tripped during short power interruptions or short thermostat cycles. On the other hand, its position and preset temperature threshold must be chosen so that it will operate to shut down and lock out the system before the maximum allowable filter temperature is exceeded. A threshold temperature setting that has been found suitable is 160° F.

Considering now the operation of a horizontal installation, when the blower motor 32 fails to operate properly, the resulting temperature rises will cause the main limit switch 28 to trip before either the auxiliary limit switch (130° F.) or the auxiliary limit switch 35 (160° F.). After cool down, the main limit switch 28 will then reset and the system will commence another cycle. This will continue for three or four cycles before the buildup of residual heat finally causes the temperature to reach the 160° F. preset threshold such that the auxiliary limit switch 35 is tripped. The system will then be in lockout condition which will require to operator to manually reset the auxiliary switch 35 before the system will again operate.

While the present invention has been disclosed with particular reference to a preferred embodiment, the concepts of this invention are readily adaptable to other embodiments, and those skilled in the art may vary the structure thereof without departing from the essential spirit of the invention.

What is claimed is:

1. An improved control system for a furnace of the type having a fuel valve, a burner, a heat exchanger, a circulation blower, a thermostat, and at least one temperature sensor, comprising:
    a first sensor/switch which is responsive to sense an overtemperature condition within the furnace resulting from a blower motor failure and to responsively open when said sensed temperature reaches a first predetermined temperature limit and to automatically close after a time delay thereafter; and
    a microprocessor for monitoring the occurrences of said first sensor/switch openings and for locking out the furnace from further operation when said openings occur a predetermined number of consecutive times in a thermostat cycle of operation.

2. A furnace control system as set forth in claim 1 and including a second sensor/switch which is responsive to sense an overtemperature condition within the furnace resulting from a blower motor failure to responsively open when said temperature reaches a second predetermined limit above said first predetermined temperature limit.

3. A control system as set forth in claim 2, wherein said second sensor/switch is of the manually resettable type.

4. A control system as set forth in claim 1, wherein said furnace is installable in either the upright or horizontal positions and further wherein said first sensor/switch is located above the heat exchanger when the furnace is in an upright position and at one side of the heat exchanger when the furnace is in the horizontal position.

5. A control system as set forth in claim 2, wherein said furnace is installable in either an upright or a horizontal position and further wherein said second sensor/switch is located above the heat exchanger when the furnace is an upright position and at one side of the heat exchanger when the furnace is in the horizontal position.

6. A method of controlling a furnace of the type having a fuel valve, a burner, a heat exchanger, a circulation air blower, and at least one temperature sensor, all contained within an enclosure, comprising the steps of:

sensing the temperature at a first location within the enclosure for the purpose of determining when the blower has failed to operate properly in a given cycle of operation;

when said temperature reaches a first predetermined level, causing a switch to open so as to thereby terminate said operational cycle;

causing said switch to automatically reset after a period of time so as to allow another operational cycle to commence;

counting the number of occurrences of said switch openings; and when said number reaches a predetermined level, locking out the furnace from further operation.

7. A method as set forth in claim 6, and including the additional steps of sensing the temperature at a second location within the enclosure for the purpose of in any given cycle of operation; and said temperature reaches a second predetermined temperature, higher than said first predetermined temperature, causing said switch to open so as to thereby lock out the furnace from further operation.

* * * * *